US011338486B2

(12) United States Patent
Kohlmann (10) Patent No.: US 11,338,486 B2
(45) Date of Patent: May 24, 2022

(54) INJECTION-MOULDING TOOL FOR PRODUCING A PLASTICS COMPONENT

(71) Applicant: EuWe Eugen Wexler Holding GmbH & Co. KG, Lauf a. d. Pegnitz (DE)

(72) Inventor: Werner Kohlmann, Heroldsberg (DE)

(73) Assignee: EuWe Eugen Wexlar Holding GmbH & Co. KG

( * ) Notice: Subject to any disclaimer, the term of this patent is extended or adjusted under 35 U.S.C. 154(b) by 578 days.

(21) Appl. No.: 15/756,686

(22) PCT Filed: Jul. 5, 2016

(86) PCT No.: PCT/EP2016/065795
§ 371 (c)(1),
(2) Date: Mar. 1, 2018

(87) PCT Pub. No.: WO2017/045793
PCT Pub. Date: Mar. 23, 2017

(65) Prior Publication Data
US 2018/0243959 A1    Aug. 30, 2018

(30) Foreign Application Priority Data
Sep. 14, 2015   (DE) .......................... 102015115466.8

(51) Int. Cl.
*B29C 45/34* (2006.01)
*B29C 45/44* (2006.01)
*B29L 31/30* (2006.01)

(52) U.S. Cl.
CPC .............. *B29C 45/34* (2013.01); *B29C 45/44* (2013.01); *B29L 2031/3014* (2013.01); *B29L 2031/3041* (2013.01)

(58) Field of Classification Search
CPC ..... B29L 2031/3041; B29L 2031/3014; B29C 45/34; B29C 45/44
See application file for complete search history.

(56) References Cited

U.S. PATENT DOCUMENTS 5,074,770 A * 12/1991 Graefe ................ B29C 44/1233
425/117
6,196,826 B1 * 3/2001 Gellert .................... B29C 45/27
425/215
(Continued)

FOREIGN PATENT DOCUMENTS

DE    102005037308 A1    2/2007
DE    102012006085 A1    4/2013
(Continued)

*Primary Examiner* — Francisco W Tschen
*Assistant Examiner* — Elisa H Vera (57) ABSTRACT

An injection-moulding tool (2) for producing an in particular thin-walled plastics component, comprising: —at least two tool elements (1, 1', 1"), wherein the at least two tool elements (1, 1', 1"), in a closed position of the injection-moulding tool (2), are moved against one another at least in sections so as to form at least a subregion of a shape-imparting tool cavity (3) of the injection-moulding tool (2), wherein—the at least two tool elements (1, 1', 1") each have at least one shape-imparting contouring structure (4, 4', 4") which delimits the tool cavity (3) at least in sections, wherein—on at least one tool element (1, 1', 1"), adjacent to the contouring structure (4, 4', 4"), there is formed at least one ventilation structure (5) for ventilating the tool cavity (3) in the closed position of the injection-moulding tool (2).

10 Claims, 5 Drawing Sheets

(56) References Cited

U.S. PATENT DOCUMENTS

| | | | |
|---|---|---|---|
| 2005/0098921 A1* | 5/2005 | Endo | B29C 45/34 264/278 |
| 2006/0188595 A1* | 8/2006 | Furukawa | B29C 45/14688 425/129.1 |
| 2006/0269651 A1* | 11/2006 | Hirao | B29C 45/401 425/556 |
| 2013/0142901 A1* | 6/2013 | Chou | B29C 45/34 425/546 |
| 2013/0224326 A1* | 8/2013 | Liu | B29C 45/34 425/546 |

FOREIGN PATENT DOCUMENTS

| | | | |
|---|---|---|---|
| EP | 0018210 | A1 | 10/1980 |
| EP | 0224007 | A2 | 6/1987 |
| JP | 2006175615 | A | 7/2006 |
| JP | 2010131790 | A | 6/2010 |

\* cited by examiner

INJECTION-MOULDING TOOL FOR PRODUCING A PLASTICS COMPONENT

CROSS-REFERENCE TO RELATED APPLICATIONS

This application is a U.S. 371 National Stage entry of International Application Serial No. PCT/EP2016/065795 filed Jul. 5, 2016, which claims priority to German Patent Application No. 102015115466.8 filed Sep. 14, 2015. The contents of each of these applications are hereby incorporated herein by reference in their entirety as if set forth verbatim.

The invention relates to an injection-molding tool for producing an in particular thin-walled plastics component, in particular an interior cladding element for cladding a door window frame of a door of a motor vehicle.

Injection-molding tools for producing plastics components are known in various embodiments in terms of construction. An adequate tool venting of the tool cavity of the injection-molding tool is to be ensured in the construction of injection-molding tools, so as to prevent air inclusions which have a negative effect (a so-called "diesel effect") on the component quality, in particular on the surface quality, of a plastics component that is to be produced by means of the injection-molding tool.

In the construction of an injection-molding tool, and of the associated conception of a venting concept for the injection-molding tool, attention has to be paid to specific component, material and process parameters, in particular the wall thickness of the component, the flow behavior of the material, injection pressure of the material, injection velocity of the material, etc.

The tool venting is a challenge in particular in the case of injection-molding tools for producing thin-walled plastics components, that is to say, for example, in the production of interior cladding elements for cladding door window frames of a door of a motor vehicle; a reliable venting has to be ensured herein despite the typically high injection velocities of the injection-molding tools when in operation.

There is therefore a requirement for injection-molding tools for producing in particular thin-walled plastics components, said injection-molding tools being improved in terms of a reliable tool venting.

The invention is based on the object of specifying an injection-molding tool for producing a plastics component that is improved in particular in terms of venting.

The object is achieved by an injection-molding tool according to the claims. The dependent claims relate to advantageous embodiments of the injection-molding tool. The object is furthermore achieved by a tool element according to the claims.

The injection-molding tool described herein generally serves for producing at least one plastics component from at least one thermoplastic plastics material. The injection-molding tool is thus generally employed or used, respectively, in the context of an injection-molding method for producing at least one plastics component.

The injection-molding tool described herein serves in particular for producing at least one thin-walled plastics component from at least one plastics material. The injection-molding tool is thus used in particular in the context of an injection-molding method for producing at least one thin-walled plastics component. A thin-walled plastics component is to be understood as a plastics component of which the wall thickness at least in portions is in a range between 0.5 and 2.5 mm, in particular in a range between 1 and 1.5 mm.

A thin-walled plastics component can be provided entirely or in portions with a wall thickness that is in the range between 0.5 and 2.5 mm, in particular between 1 and 1.5 mm. A thin-walled plastics component can consequently in portions have dissimilar wall thicknesses, that is to say in particular in portions also have wall thicknesses of more than 2.5 mm.

A respective thin-walled plastics component is specifically in particular an interior cladding element for cladding a window frame, or a door window frame, respectively, of a door of a motor vehicle, that is to say a window frame cladding element.

A plastics material for producing at least one thin-walled plastics component can be, for example, polyamide or polypropylene. A plastics material is also to be understood to be a mixture of a plurality of chemically dissimilar plastics materials. The plastics material can be filled with reinforcement fibers, that is to say, for example, glass fibers. The proportion of reinforcement fibers can be between 5 and 25% by weight, in particular approx. 15% by weight, depending on the plastics material.

The injection-molding tool comprises at least two tool elements.

In the case of the injection-molding tool comprising (only) two tool elements, a first tool element can be configured as a first tool mold half, or comprise such a first tool mold half, and a second tool element can be configured as a second tool mold half, or comprise at least one such second tool mold half. Alternatively, a second tool element can also be configured as a mold core or a mold slide, or comprise at least one such mold core or mold slide.

In the case of the injection-molding tool comprising more than two tool elements, a first tool element can be configured as a first tool mold half, or comprise such a first tool mold half, a second tool element can be configured as a second tool mold half, or comprise such a second tool mold half, and a third or further tool element can be configured as a mold core or a mold slide, or comprise at least one such mold core or mold slide.

The in any case at least two tool elements in a closed position of the injection-molding tool are at least in portions converged while configuring at least one part-region of a shape-imparting tool cavity of the injection-molding tool. The shape-imparting tool cavity of the injection-molding tool represents the geometric design of the plastics component to be produced by means of the injection-molding tool.

If the injection-molding tool comprises (only) two tool elements, a first tool element can be mounted so as to be movable, relative to a second tool element, between an open position and a closed position. In the closed position of the movably mounted first tool element, said closed position typically corresponding to the closed position of the injection-molding tool, said first tool element is moved toward the second tool element; the tool elements form at least one part-region of the shape-imparting tool cavity of the injection-molding tool, optionally the entire shape-imparting tool cavity of the injection-molding tool. Of course, both tool elements can also be correspondingly mounted so as to be movable, relative to one another, between an open and a closed position. The tool elements in the closed position thereof that typically corresponds to the closed position of the injection-molding tool are converged; the tool elements form at least one part-region of the shape-imparting tool cavity of the injection-molding tool, optionally the entire shape-imparting tool cavity of the injection-molding tool.

The same applies in an analogous manner in the case of the injection-molding tool comprising more than two tool elements. Here, at least one tool element can be mounted so as to be movable, relative to at least one further tool element, between an open position and a closed position. In the closed position of the movably mounted tool element that typically corresponds to the closed position of the injection-molding tool, said tool element is moved toward at least one further tool element; the tool elements form at least one part-region of the shape-imparting tool cavity of the injection-molding tool, optionally the entire shape-imparting tool cavity of the injection-molding tool. Of course a plurality, optionally all, tool elements can also be mounted so as to be movable in a corresponding manner, relative to one another, between an open and a closed position. The tool elements in the closed positions thereof that typically correspond to the closed position of the injection-molding tool, are converged; the tool elements form at least one part-region of the shape-imparting tool cavity of the injection-molding tool, optionally the entire shape-imparting tool cavity of the injection-molding tool.

In order for the tool cavity of the injection-molding tool to be configured or delimited, respectively, each tool element has a shape-imparting contouring structure which at least in portions forms or delimits, respectively, the tool cavity of the injection-molding tool, in particular in the closed position of the injection-molding tool. Respective contouring structures represent in each case one part of the geometric design of the plastics component that is to be produced by means of the injection-molding tool. A contouring structure can be formed, for example, by a clearance within a tool element. This applies in particular in the case in which a tool element is a tool mold half. A contouring structure can also be formed by an external or internal contour, or by an external or internal (sur)face of a tool element. This applies in particular in the case in which a tool element is a mold core for a mold slide.

A respective contouring structure can at least in portions be provided with a specific surface structure ("grain") that is formed by sandblasting, for example.

At least one venting structure for venting the tool cavity in the closed position of the injection-molding tool is configured at least on one tool element in a manner so as to be (directly) adjacent to the contouring structure. The contouring structure and the venting structure can be mutually separated by way of an edge-type or edge-shaped, respectively, tool element portion, in particular a closing edge. A respective contouring structure can thus be unequivocally demarcated from a respective venting structure by way of an edge-type or edge-shaped, respectively, tool element portion, in particular a closing edge.

The venting structure has a particular design and has a typically flat or planar, respectively, base plane. The particular design of the venting structure is a result of the venting structure having a plurality of venting elements that protrude from the base plane, wherein venting paths for venting the tool cavity, in particular in the closed position of the injection-molding tool, are formed between the venting elements. The venting elements that project from the base plane of the venting structure and thus are raised in relation to the base plane of the venting structure, can also be referred to or considered as, respectively, venting protrusions.

The venting elements can project from the base plane of the venting structure by, for example, a dimension in a range between 0.02 and 0.03, in particular by a dimension of approx. 0.025 mm. A dimension of this type is typically sufficient for securing a reliable venting of the tool cavity of the injection-molding tool.

The venting elements are typically disposed so as to be mutually adjacent. The spacing between two venting elements that are disposed so as to be directly adjacent is typically in a range between 2 and 8 mm, in particular in a range between 4 and 6 mm. A spacing of this type is typically sufficient for ensuring a reliable venting of the tool cavity of the injection-molding tool. A castellated arrangement of respective venting elements can result from the adjacent arrangement of the venting elements.

The venting structure can be configured so as to encircle in portions or completely a respective contouring structure, or the tool cavity of the injection-molding tool to be vented, respectively. Accordingly, venting of the tool cavity can be implemented in portions or in a completely encircling manner about the tool cavity. In any case, a reliable venting of the tool cavity of the injection-molding tool is ensured by the multiplicity of venting elements and by the multiplicity of venting paths that result therefrom.

Respective venting paths are typically delimited or formed, respectively, by the base plane, at least two venting elements that are disposed so as to be directly adjacent, and a portion of a tool element that in the closed position of the injection-molding tool is moved toward the tool element that is configured with a respective venting structure.

The venting paths can communicate with an in particular groove-type venting duct structure that is disposed or configured so as to be adjacent to the venting structure, or can transition to such a venting duct structure. Since the individual venting paths transition to the venting duct structure, the venting duct structure serves in a manner analogous to that of a collection line. An actual exit of a fluid to be vented, typically air, from the injection-molding tool can be performed by way of the venting duct structure. At least one venting duct structure portion can at least in portions extend along the exposed external face of the tool element. The venting duct structure can be configured so as to encircle the venting structure at least in portions, in particular completely, and/or can be configured so as to extend in angular manner, in particular perpendicularly, to the venting structure.

The geometric-constructive design of the venting elements, in particular in terms of the venting paths that are (conjointly) delimited by said venting elements, can be identical or dissimilar. Accordingly, individual, a plurality of, or all of the venting elements in terms of the geometric-constructive design thereof can be identical, similar, or entirely dissimilar.

The venting elements are typically configured so as to be integral to the venting structure, or to a tool element, respectively. The configuration of the venting structure, or of the venting elements, respectively, can be performed, for example, by subtracting material, for example by etching, eroding, or milling processes, from the tool element in the region of the venting structure to be configured. Herein, material is subtracted in a targeted manner in the region of the base plane of the venting structure that is to be configured. No material, or comparatively less material, is subtracted in the region of the venting elements that are to be configured so as to project from the base plane. Conversely, the configuration of the venting structure, or of the venting elements, respectively, can be performed by an addition of material onto the tool element in the region of the venting structure to be configured. Herein, material is added in a targeted manner in the region of the configured base plane of the venting structure.

The venting elements expediently have in each case at least one closing portion. Respective closing portions in the closed position of the injection-molding tool are capable of being brought to bear (in a directly contacting manner) on at least one further tool element, or a mating portion of a further tool element that typically communicates with a respective closing portion, or said respective closing portions in the closed position of the injection-molding tool bear (in a directly contacting manner) on at least one further tool element, or a mating portion of a further tool element that typically communicates with a respective closing portion, respectively. The closing portions are configured for receiving closing forces that act in the closed position of the injection-molding tool. The closing portions at least in portions typically extend so as to be parallel with the base plane of the venting structure, and in the open position of the injection-molding tool typically form a part of the exposed surface of the venting structure.

The venting elements expediently have in each case at least one flow portion around which in the closed position of the injection-molding tool a fluid that is to be vented from the tool cavity is capable of circulating, or circulates, respectively. A flow portion typically represents the external contour, or the basic shape, respectively, of a respective venting element.

The flow portions are exposed in the closed position of the injection-molding tool, that is to say that a respective flow portion in the closed position of the injection-molding tool cannot be brought to bear on at least one further tool element, or in the closed position of the injection-molding tool does not bear on at least one further tool element, respectively. The flow portions expediently have a geometrical design that in terms of fluid technology is optimized with a view to venting the injection-molding tool. The geometric design of the tool cavity to be vented is in particular relevant herein.

A respective venting element can at least in portions (in a convex or concave manner) have a bent, curved, or bulged basic shape, wherein a respective flow portion, in a manner following the basic shape of the venting element, can at least in portions (in a convex or concave manner) be configured so as to run in a bent, curved, or bulged shape. A respective geometric design of a venting element, or of a flow portion, respectively, can positively influence an outflow of a fluid to be vented from the tool cavity, and is typically optimized with a view to the venting of the tool cavity of the injection-molding tool. Desired flow properties of the fluid to be vented can be set, or undesirable turbulences of the fluid to be vented can be suppressed, respectively, by a respective geometric design of a venting element, or of a flow portion, respectively.

A respective flow portion can be formed by at least two mutually contiguous flow portion parts, wherein the at least two mutually contiguous flow portion parts or generally at least two mutually contiguous flow portion parts, respectively, at least in portions can be configured so as to run in an identically or dissimilarly (convex or concave) bent, curved, or bulged manner. A respective geometric design of a venting element, or of a flow portion, can facilitate an outflow of a fluid that is to be vented from the tool cavity, and is typically optimized with a view to the venting of the tool cavity of the injection-molding tool. Desired flow properties of the fluid to be vented can be set, or undesirable turbulences of the fluid to be vented can be suppressed, respectively, by a respective geometric design of aventing element, or of a flow portion, respectively.

A respective venting element can at least in portions also have a polygonal, in particular triangular, basic shape, wherein the at least one flow portion is formed by mutually contiguous flow portion parts, wherein the flow portion parts are configured so as to run in a mutually angular manner. A respective geometric design of a venting element, or of a flow portion, respectively, can likewise facilitate an outflow of a fluid to be vented from the tool cavity, and is typically optimized with a view to the venting of the tool cavity of the injection-molding tool. Desired flow properties of the fluid to be vented can be set, or undesirable turbulences of the fluid to be vented can be suppressed, respectively, by a respective geometric design of a venting element, or of a flow portion, respectively.

Of course, hybrid forms of the above-mentioned geometric designs of the venting elements, or of respective flow portions, respectively, are conceivable.

It applies in general that a respective venting element can be configured by flow portion parts that in geometric terms are at least in portions configured identically or dissimilarly, and so as to be at least in portions symmetrical, or at least in portions asymmetrical, in relation to a central axis of the venting element. An outflow of a fluid to be vented from the tool cavity of the injection-molding tool can be likewise facilitated by a configuration of the venting element that at least in portions is symmetrical, or at least in portions is asymmetrical. In particular, desired flow properties of the fluid to be vented can be set, or undesirable turbulences of the fluid to be vented can be suppressed, respectively, by a configuration of the venting element that at least in portions is symmetrical, or at least in portions is asymmetrical.

As has been mentioned, the contouring structure and the venting structure can be mutually separated by an edge-type or edge-shaped, respectively, tool element portion, in particular a closing edge. In this case, the free end of a venting element that faces the contouring structure can be configured so as to be contiguous in a contacting manner to the edge-type or edge-shaped, respectively, tool element portion, or so as to be spaced apart from the edge-type or edge-shaped, respectively, tool element portion. The spacing of a venting element from the edge-type or edge-shaped, respectively, tool element portion can be in a range between 1 and 2 mm, for example. Desired flow properties of the fluid to be vented can be set, or undesirable turbulences of the fluid to be vented can be suppressed, respectively, also by way of a spacing of a venting element from the edge-type or edge-shaped, respectively, tool element portion.

The invention furthermore relates to a tool element for an injection-molding tool, in particular for an injection-molding tool as has been described above. The tool element has a shape-imparting contouring structure which in the closed position of the injection-molding tool at least in portions delimits a tool cavity of an injection-molding tool, wherein at least one venting structure for venting the tool cavity of the injection-molding tool is configured so as to be adjacent to the contouring structure. The tool element is distinguished in that the venting structure has a plurality of venting elements that project from an in particular flat or planar, respectively, base plane of the venting structure, wherein venting paths for venting the tool cavity of the injection-molding tool in the closed position of the injection-molding tool are formed between the venting elements. The tool element can be, for example, a tool mold half or a mold core or a mold slide for an injection-molding tool. All explanations in the context of the injection-molding tool apply in an analogous manner to the tool element.

The invention moreover relates to a method for producing an in particular thin-walled plastics component, preferably an interior cladding element for cladding a door window frame of a door of a motor vehicle. The method is distinguished in that in the context of the method at least one injection-molding tool as has been described above, or at least one tool element as has been described above, respectively, is used. In other words, the invention also relates to the use of an injection-molding tool as has been described above, or to the use of at least one tool element as has been described above, respectively, in the context of an injection-molding method for producing an in particular thin-walled plastics component, preferably an interior cladding element for cladding a door window frame of a door of a motor vehicle. All explanations in the context of the injection-molding tool apply in an analogous manner to the method, or to the use, respectively.

Figure 1:
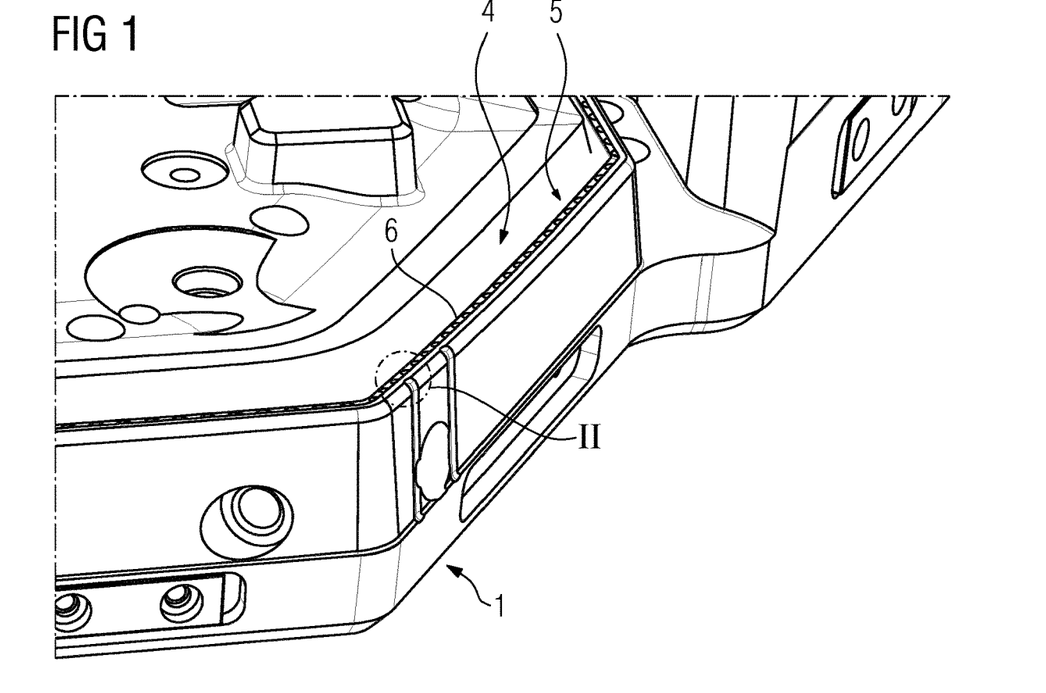
FIGS. 1, 2 show in each case an in-principal illustration of a tool element for an injection-molding tool according to an exemplary embodiment.
Figure 2:
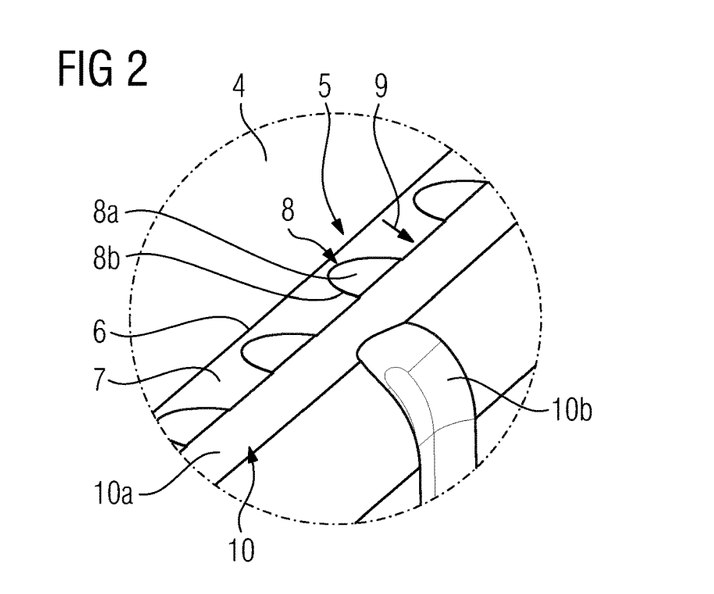

The invention will be explained in more detail by means of exemplary embodiments in the following figures in the drawings, in which:

FIG. 1 shows an in-principal illustration of a fragment of a tool element 1 for an injection molding tool 2 according to an exemplary embodiment, in a perspective view. FIG. 2 shows an enlargement of the detail II shown in FIG. 1.

A respective injection-molding tool 2 is shown in each case in fragments in a cross-sectional view in FIGS. 3-8. The injection-molding tool 2 serves for producing a thin-walled plastics component from a thermoplastic plastics material. The injection-molding tool 2 is thus used in the context of an injection-molding method for producing a thin-walled plastics component from a thermoplastic plastics material, that is to say, for example, polyamide or polypropylene. The plastics material can be filled with reinforcement fibers, that is to say, for example, glass fibers. The proportion of reinforcement fibers can be approx. 15% by weight.

A thin-walled plastics component is to be understood as a plastics component of which the wall thickness at least in portions is in a range between 0.5 and 2.5 mm, in particular in a range between 1 and 1.5 mm. A thin-walled plastics component can be provided entirely or in portions with a wall thickness that is in the range between 0.5 and 2.5 mm, in particular between 1 and 1.5 mm. A thin-walled plastics component can consequently in portions have dissimilar wall thicknesses, that is to say in particular in portions also have wall thicknesses of more than 2.5 mm.

A thin-walled plastics component is specifically an interior cladding element for cladding a window frame, or a door window frame, respectively, of a door of a motor vehicle, that is to say said thin-walled plastics component is a window frame cladding element.

The injection-molding tool 2 comprises at least two tool elements 1, 1', 1". The tool element 1 shown in FIG. 1 is a (first) tool mold half of the injection-molding tool 2. Only the features of the tool element 1 that are relevant to the technical principal described herein will be explained hereunder.

In order for a tool cavity 3 of the injection-molding tool 2 to be configured or delimited, respectively, the tool element 1 has a shape-imparting contouring structure 4. The contouring structure 4 in portions delimits the tool cavity 3 of the injection-molding tool 2, in particular in the closed position of the injection-molding tool 2, and represents a part of the geometric design of the plastics component that is to be produced by means of the injection-molding tool 2. The contouring structure 4 is formed by a clearance within a tool element 1. The contouring structure 4 can at least in portions be provided with a specific surface structure ("grain") that is formed, for example, by sandblasting.

A venting structure 5 for venting the tool cavity 3 of the injection-molding tool 2 in the closed position is configured so as to be directly adjacent to the contouring structure 4. The contouring structure 4 and the venting structure 5 are mutually separated by an edge-type or edge-shaped, respectively, tool element portion 6, in particular a closing edge. The contouring structure 4 can thus be unequivocally demarcated from the venting structure 5 by way of the edge-type or edge-shaped, respectively, tool element portion 6.

The venting structure 5 has a flat or planar, respectively, base plane 7. As can be seen in particular by means of FIG. 2, the venting structure 5 has a plurality of venting elements 8 that project from the base plane 7. Venting paths 9 for venting the tool cavity 3 in the closed position of the injection-molding tool 2 are formed between the venting elements 8, said venting paths 9 being indicated by the arrows. The venting paths 9 are in each case formed by the base plane 7, by at least two venting elements 8 that are disposed so as to be directly adjacent, and by a portion of a tool element 1', 1" that in the closed position of the injection-molding tool 2 is moved toward the tool element 1 that is configured with the venting structure 5.

The venting elements 8 project from the base plane 7 of the venting structure 5 by a dimension in a range between 0.02 and 0.03, in particular by a dimension of approx. 0.025 mm. A dimension of this type is sufficient for ensuring a reliable venting of the tool cavity 3 of the injection-molding tool 2.

The venting elements 8 are disposed so as to be adjacent. The spacing between two venting elements 8 that are disposed so as to be directly adjacent is in a range between 2 and 8 mm, in particular approx. 5 mm. A castellated arrangement of respective venting elements 8 results from the adjacent arrangement of the venting elements 8.

The free ends of the venting elements 8 that face the contouring structure 4 are configured so as to be spaced apart from the edge-type or edge-shaped, respectively, tool element portion 6. The spacing of the venting elements 8 from the edge-type or edge-shaped, respectively, tool element portion 6 is in a range between 1 and 2 mm.

The venting structure 5 is configured so as to completely encircle the contouring structure 4, or the tool cavity 3 of the injection-molding tool 2 to be vented, respectively. Accordingly, a venting of the tool cavity 3 that completely encircles the tool cavity 3 is implemented. In principle, it would also be conceivable for the venting structure 5 to be configured so as to encircle only in portions the contouring structure 4, or the tool cavity 3 of the injection-molding tool 2 to be vented, respectively. In any case, a reliable venting of the tool cavity 3 of the injection-molding tool 2 is ensured by the multiplicity of venting elements 8 and by the multiplicity of venting paths 9 resulting therefrom.

The venting paths 9 communicate with a groove-type venting duct structure 10 that is configured so as to be adjacent to the venting structure 5, or said venting paths 9 transition to said venting duct structure 10, respectively. An actual exit of the fluid to be vented, typically air, from the injection-molding tool 2 is performed by way of the venting duct structure 10 that serves in a manner analogous to that of a collection line. The venting duct structure 10, by way of a first venting duct structure portion 10*a*, is configured so as to completely encircle the venting structure 5. A second venting duct structure portion 10*b* that communicates with the first venting duct structure portion 10*a* extends in an angular manner, that is to say perpendicularly, to the first venting duct structure portion 10*a* and to the venting structure 5. The second venting duct structure portion 10*b* extends along the exposed external face of the tool element 1.

The venting elements 8 have in each case one closing portion 8*a*. The closing portions 8*a* in the closed position of the injection-molding tool 2 are capable of being brought to bear in a directly contacting manner on one further tool element 1', 1", or a mating portion of a further tool element 1', 1" that communicates with a respective closing portion 8*a*, respectively, or said respective closing portions 8*a* in the closed position of the injection-molding tool 2 bear in a directly contacting manner on one further tool element 1', 1", or a mating portion of a further tool element 1', 1" that communicates with a respective closing portion 8*a*, respectively (cf. FIG. 5). The closing portions 8*a* are configured for receiving closing forces that act in the closed position of the injection-molding tool 2. The closing portions 8*a* at least in portions extend so as to be parallel with the base plane 7 of the venting structure 5, and in the open position of the injection-molding tool 2 form a part of the exposed surface of the venting structure 5 (cf. FIG. 2).

The venting elements 8 moreover have in each case at least one flow portion 8*b*. The fluid that is to be vented from the tool cavity 3 is capable of flowing around, or flows around the flow portions 8*b* in the closed position of the injection-molding tool 2. The flow portions 8*b* represent in each case the external contour, or the basic shape, respectively, of a venting element 8. The flow portions 8*a* are exposed in the closed position of the injection-molding tool 2, that is to say that the flow portions 8*b* in the closed position of the injection-molding tool 2 are not capable of being brought to bear on a further tool element 1', 1", or in the closed position of the injection-molding tool 2 do not bear on a further tool element 1', 1", respectively.

The flow portions 8*b* in the exemplary embodiment shown in FIGS. 1, 2 have a geometric, rounded bent design that in terms of fluid technology is optimized with a view to venting the injection-molding tool 2.

Figure 3:
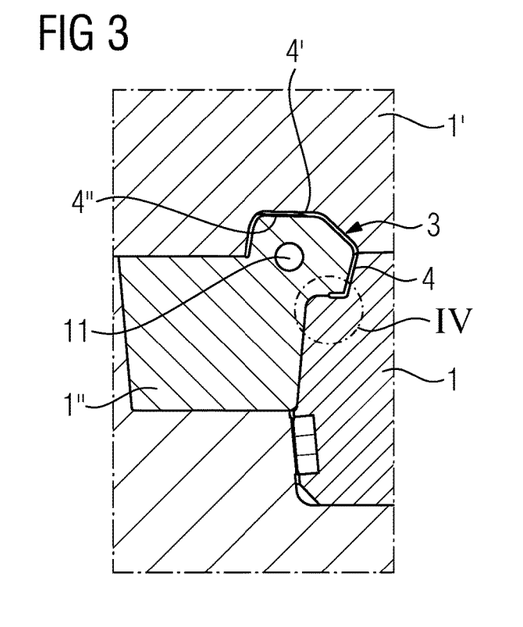
FIGS. 3-8 show in each case a sectional view through an injection-molding tool according to an exemplary embodiment.
Figure 4:
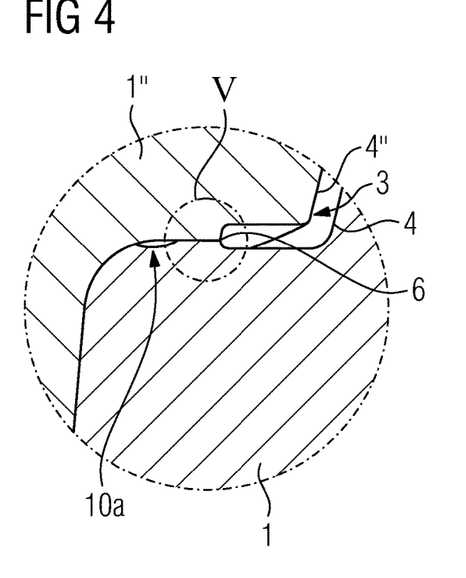
Figure 5:
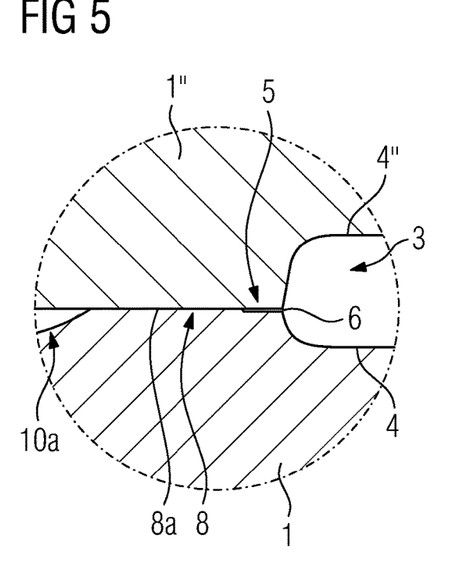
Figure 6:
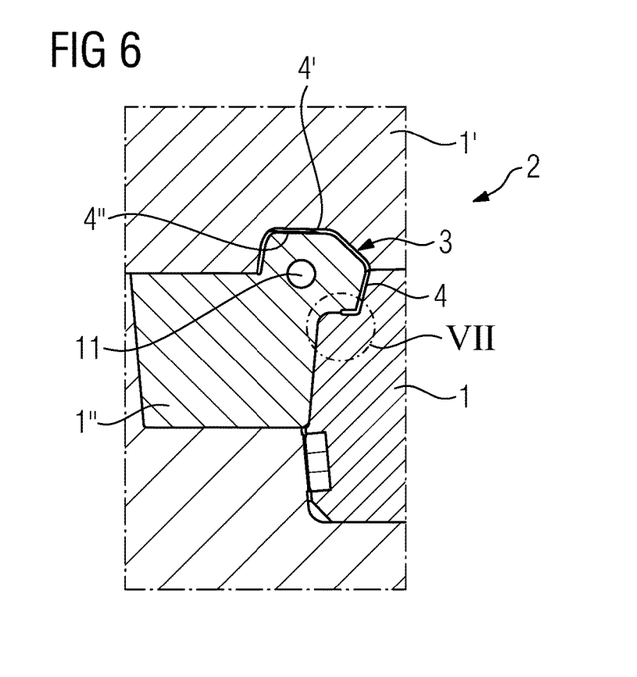
Figure 7:
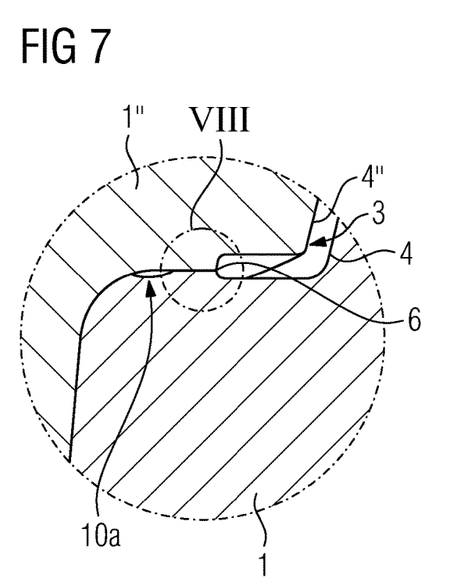
Figure 8:
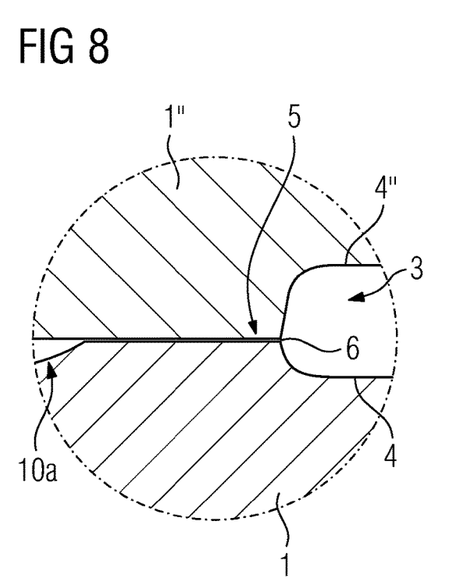

FIGS. 3-8 show in each case sectional views through a fragment of an injection-molding tool 2 according to an exemplary embodiment. The sectional views shown in FIGS. 3-5 in the region of the venting structure 5 of the tool element 1 run through a venting element 8. FIG. 4 herein shows an enlargement of the detail IV shown in FIG. 3, and FIG. 5 shows an enlargement of the detail V shown in FIG. 4. The sectional views shown in FIGS. 6-8 in the region of the venting structure 5 of the tool element 1 run through a venting path 9, and not through a venting element 8; FIG. 7 herein shows an enlargement of the detail VII shown in FIG. 6, and FIG. 8 shows an enlargement of the detail VIII shown in FIG. 7.

The injection-molding tool 2 shown in FIGS. 3-8 comprises three tool elements 1, 1', 1", that is to say a first, second, and a third tool element 1, 1', 1". The first tool element 1 is a tool mold half according to the exemplary embodiment shown in FIGS. 1, 2, the second tool element 1' is a further tool mold half, and the third tool element 1" is a mold core.

In order for the tool cavity 3 of the injection-molding tool 2 to be configured or delimited, respectively, each tool element 1, 1', 1" has a shape-imparting contouring structure 4, 4', 4". The contouring structures 4, 4', 4" delimit the tool cavity 3 of the injection-molding tool 2, in particular in the closed position of the injection-molding tool 2, and represent in each case a part of the geometric design of the plastics component that is to be produced by means of the injection-molding tool 2.

The tool elements 1, 1', 1" are mounted so as to be movable relative to one another between an open position and a closed position. In the closed position of the tool elements 1, 1', 1" that typically corresponds to the closed position of the injection-molding tool 2, said tool elements 1, 1', 1" are converged and form the complete tool cavity 3 of the injection-molding tool 2 (cf. FIGS. 3, 6).

The contouring structure 4 of the first tool element 1 is formed by a clearance within the first tool element 1. The contouring structure 4' of the second tool element 1' is also formed by a clearance in the second tool element 1'. The contouring structure 4" of the third tool element 1" is formed by a part of the external contour, or the external (sur)face, respectively, of the third tool element 1".

For the sake of completeness it is to be noted that the bore that is configured in the third tool element 1" forms part of a temperature-control duct structure 11 for temperature-controlling the third tool element 1", or for temperature-controlling the injection-molding tool 2, respectively. Respective temperature-control duct structures 11 can of course also be configured in the other tool elements 1, 1'.

A method for producing an in particular thin-walled plastics component, preferably an interior cladding element for cladding a door window frame of a door of a motor vehicle, can be implemented by way of the tool element 1 shown in FIGS. 1, 2, or by way of the injection-molding tool 2 shown in FIGS. 3-8. In other words, the tool element 1 shown in FIGS. 1, 2, or the injection-molding tool 2 shown in FIGS. 3-8, can be used in the context of an injection-molding method for producing an in particular thin-walled plastics component, preferably an interior cladding element for cladding a door window frame of a door of a motor vehicle.

FIGS. 9-14 show in each case in-principal illustrations of a venting element 8 of a venting structure 5 of a tool element 1, 1', 1" for an injection-molding tool 2 according to further exemplary embodiments. The geometric configuration of the venting elements 8 that in principle is freely selectable can be visualized by means of the exemplary embodiments shown in FIGS. 9-14.

Figure 9:
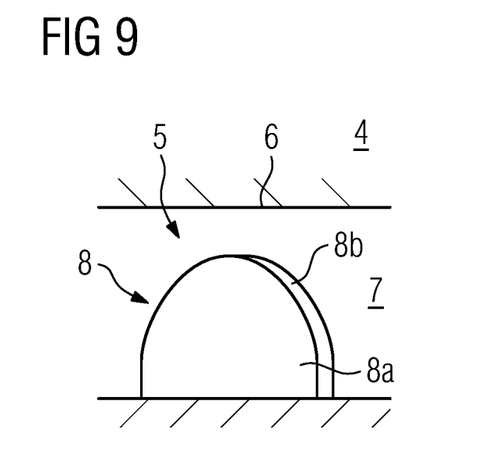
FIGS. 9-14 show in each case an in-principal illustration of a venting element of a venting structure of a tool element for an injection-molding tool according to an exemplary embodiment.

The flow portion 8*b* of the venting element 8 in the exemplary embodiment shown in FIG. 9 comprises one flow portion part that runs in a linear manner and one flow portion part that runs in a rounded outwardly bent manner, such that an overall U-shaped basic shape of the venting element 8 results.

Figure 10:
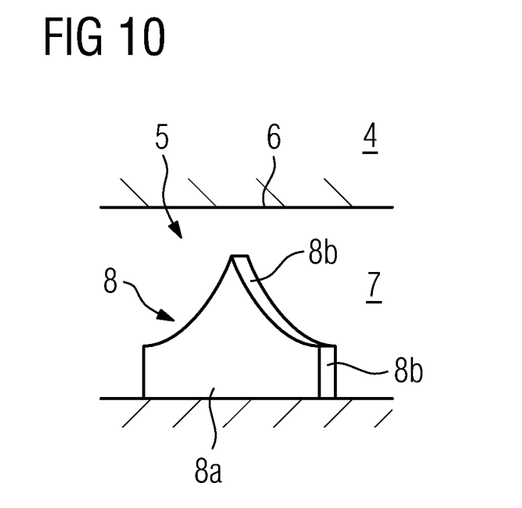

The flow portion 8*b* of the venting element 8 in the exemplary embodiment shown in FIG. 10 comprises one flow portion part that runs in a linear manner, and one flow portion part that runs in a rounded inwardly bent manner, such that an overall circus-tent-type basic shape of the venting element 8 results.

Figure 11:
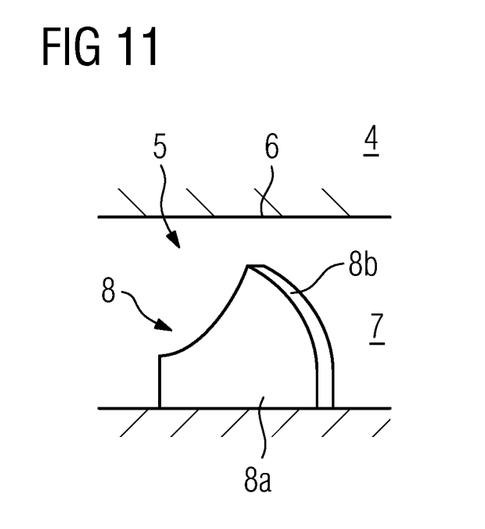

The flow portion 8*b* of the venting element 8 in the exemplary embodiment shown in FIG. 11 comprises one flow portion part that runs in a linear manner, and two flow portion parts that run in a dissimilarly bent manner, such that an overall sawtooth-type basic shape of the venting element 8 results.

Figure 12:
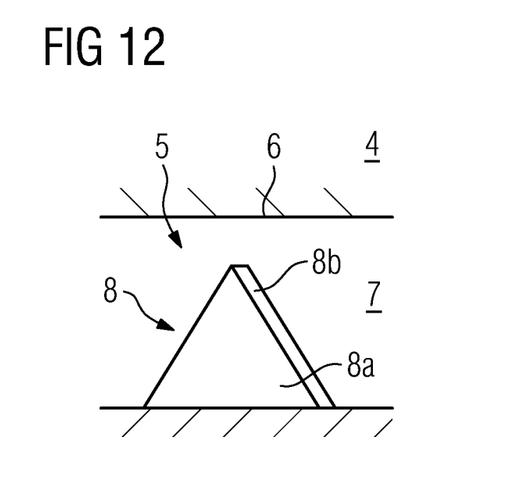

The flow portion 8*b* of the venting element 8 in the exemplary embodiment shown in FIG. 12 comprises two flow portion parts that converge in a linear manner at a specific angle, such that an overall triangular basic shape of the venting element 8 results.

Figure 13:
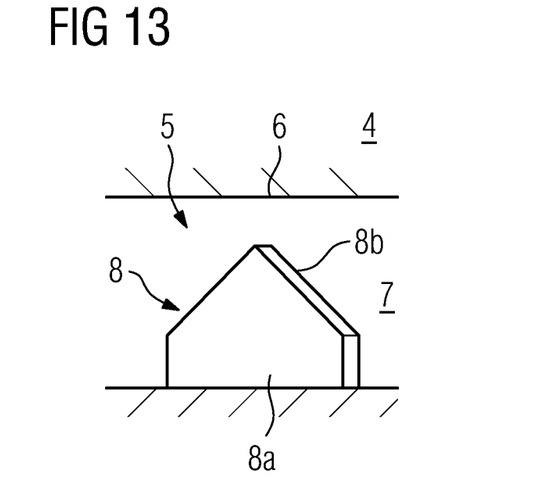

The flow portion 8b of the venting element 8 in the exemplary embodiment shown in FIG. 13 comprises one flow portion part that runs in a linear manner, and two flow portion parts that converge in a linear manner at a specific angle, such that an overall house(roof)-shaped basic shape of the venting element 8 results.

Figure 14:
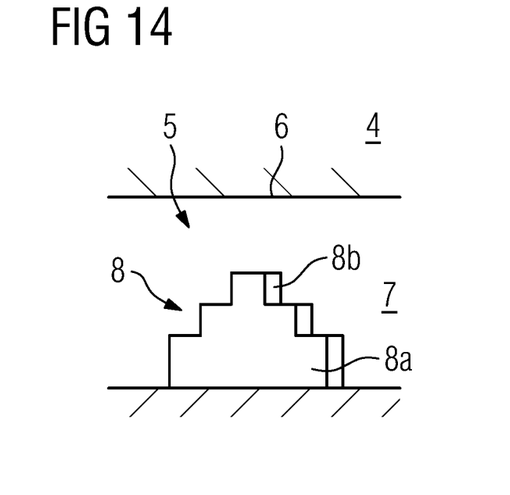

The flow portion 8b of the venting element 8 in the exemplary embodiment shown in FIG. 14 comprises a plurality of flow portion parts that run in the manner of steps, such that an overall step-shaped basic shape of the venting element 8 results.

It applies in general that a venting element 8 can be configured by flow portion parts that in geometric terms are at least in portions configured identically or dissimilarly, and so as to be at least in portions symmetrical, or at least in portions asymmetrical, in relation to a central axis of the venting element 8.

Independently of the specific geometric-constructive design embodiment thereof, the venting elements 8 are typically configured so as to be integral to the venting structure 5, or to a tool element 1, 1', 1". The configuration of the venting structure 5, or of the venting elements 8, respectively, can be performed by subtracting material, for example by etching, eroding, or milling processes, from a tool element 1, 1', 1" in the region of the venting structure 5 to be configured. Herein, material is subtracted in a targeted manner in the region of the base plane 7 of the venting structure 5 that is to be configured. No material, or comparatively less material, is subtracted in the region of the venting elements 8 that are to be configured so as to project from the base plane 7. Conversely, the configuration of the venting structure 5, or of the venting elements 8, respectively, can be performed by an addition of material onto the tool element 1, 1', 1" in the region of the venting structure 5 to be configured. Herein, material is added in a targeted manner in the region of the configured base plane 7 of the venting structure 5.

LIST OF REFERENCE SIGNS

1, 1', 1" Tool element
2 Injection-molding tool
3 Tool cavity
4, 4', 4" Contouring structure
5 Venting structure
6 Tool element portion
7 Base plane
8 Venting element
8a Closing portion
8b Flow portion
9 Venting path
10 Venting duct structure
10a Venting duct structure portion
10b Venting duct structure portion
11 Temperature-control duct structure

The invention claimed is:

1. An injection-molding tool for producing a plastics interior cladding element for a motor vehicle, comprising:
at least two tool elements, wherein the
at least two tool elements have in each case at least one shape-imparting contouring structure which delimits a tool cavity of the injection-molding tool in the closed position of the injection-molding tool at least in portions, wherein at least one venting structure for venting air from the tool cavity in the closed position of the injection-molding tool is configured on a first tool element of the at least two tool elements in a plane forming the parting plane of the injection molding tool, wherein the venting structure has a plurality of venting elements that project from base plane of the first tool element, wherein venting paths for venting the tool cavity in the closed position of the injection-molding tool are formed between the venting elements; wherein the venting paths are delimited or formed, respectively, by the base plane of the first tool element, at least two directly adjacently disposed venting elements that are integrally formed with and extending off the base plane, and a flat base plane of a second tool element of the at least two tool elements that in the closed position of the injection-molding tool is moved toward the first tool element that is configured with the venting structure; wherein the at least two venting elements have in each case one flow portion along which in the closed position of the injection-molding tool the air that is to be vented from the tool cavity at least partly flows, parallel to the base plane; wherein at least one venting element of the at least two venting elements at least in portions has a curved shape, wherein the at least one flow portion at least in portions is configured so as to run in a curved manner; or at least one venting element of the at least two venting elements at least in portions has a polygonal shape, wherein the at least one flow portion is formed by a plurality of flow portion parts forming a polygon, wherein each of the flow portion parts are configured so as to run in a mutually angular manner.

2. The injection-molding tool as claimed in claim 1, wherein the venting elements have in each case one closing portion which in the closed position of the injection-molding tool is capable of being brought to bear on at least one further tool element of the at least two tool elements, or in the closed position of the injection-molding tool bears on the at least one further tool element, respectively.

3. The injection-molding tool as claimed in claim 1, wherein the at least one flow portion is formed by at least two mutually contiguous flow portion parts, wherein at least two flow portion parts at least in portions are configured so as to run in an identically or dissimilarly bent manner.

4. The injection-molding tool as claimed in claim 1, wherein the venting paths communicate with a groove-type venting duct structure that is disposed or configured so as to be adjacent to the venting structure.

5. The injection-molding tool as claimed in claim 1, wherein the contouring structure and the venting structure are mutually separated by an edge-shaped tool element portion, in a closing edge.

6. The injection-molding tool as claimed in claim 1, wherein the free end of at least one venting element of the at least two venting elements is contiguous in a contacting manner to the edge-shaped tool element portion, or is spaced apart from the edge-shaped tool element portion.

7. The injection-molding tool as claimed in claim 1, wherein the at least two venting elements project from the base plane of the venting structure by a dimension in a range between 0.02 and 0.03 mm.

8. The injection-molding tool as claimed in claim 1, wherein a first tool element of the at least two tool elements is configured as a first tool mold half, or comprises such a first tool mold half, and a second tool element of the at least two tool elements is configured as a second tool mold half, or comprises at least one such second tool mold half, or is configured as a mold slide or mold core, or comprises at least one such mold slide or mold core.

9. An injection-molding tool for producing a plastics interior cladding element for a motor vehicle, comprising:
at least two tool elements, wherein the
at least two tool elements have in each case at least one shape-imparting contouring structure which delimits a cavity of the injection-molding tool in the closed position of the injection-molding tool at least in portions, wherein
at least one venting structure for venting air from the tool cavity in the closed position of the injection-molding tool is configured on a first tool element of the at least two tool elements in a plane forming the parting plane of the injection molding tool, wherein the venting structure has a plurality of venting elements that project from a base plane of the first tool element, wherein venting paths for venting the tool cavity in the closed position of the injection-molding tool are formed between the venting elements; wherein
the venting paths are delimited or formed, respectively, by the base plane of the first tool element, at least two directly adjacently disposed venting elements (8) that are integrally formed with and extending off the base plane, and a Hai baste plane of second tool element of the at least two tool elements that in the closed position of the injection-molding tool is moved toward the first tool element that is configured with the venting structure; wherein
the at least two venting elements have in each case one flow portion along which in the closed position of the injection-molding tool the air that is to be vented from the tool cavity at least partly flows, parallel to the base plane; wherein
at least one venting element of the at least two venting elements at least in portions has a curved shape, wherein the at least one flow portion at least in portions is configured so as to run in a curved manner; or
at least one venting element of the at least two venting elements at least in portions has a polygonal shape, wherein the at least one flow portion is formed by a plurality of flow portion parts forming a polygon, wherein each of the flow portion parts are configured so as to run in a mutually angular manner, and
wherein the contouring structure and the venting structure are mutually separated by an edge-shaped tool element portion, in a closing edge.

10. An injection-molding tool for producing a plastics interior cladding element for a motor vehicle, comprising:
at least two tool elements, wherein
the at least two tool elements have in each case at least one shape-imparting contouring structure which delimits a tool cavity of the infection-molding tool in the closed position of the injection-molding tool at least in portions, wherein
at least one venting structure for venting air from the tool cavity in the closed position of the injection-molding tool is configured on a first tool element of the at least two tool elements in a plane forming the parting plane of the injection molding tool, wherein the venting structure has a base plane and a plurality of venting elements that project from the base plane of the first tool element, wherein venting paths for venting the tool cavity in the closed position of the injection-molding tool are formed between the venting elements; wherein
the venting paths are delimited or formed, respectively, by the base plane of the first tool element, at least two directly adjacently disposed venting elements that are integrally formed with and extending off the base plane, and a flat base plane of a second tool element of the at least two tool elements that in the closed position of the injection-molding tool is moved toward the first tool element that is configured with the venting structure; wherein
the at least two venting elements have in each case one flow portion along which in the closed position of the injection-molding tool the air that is to be vented from the tool cavity at least partly flows, parallel to the base plane; wherein
at least one venting element of the at least two venting elements at least in portions has a curved shape, wherein the at least one flow portion at least in portions is configured so as to run in a curved manner; or
at least one venting element of the at least two venting elements at least in portions has a polygonal shape, wherein the at least one flow portion is formed by a plurality of flow portion parts forming a polygon, wherein each of the flow portion parts are configured so as to run in a mutually angular manner, and
wherein the free end of the at least two venting elements is contiguous in a contacting manner to the edge-shaped tool element portion, or is spaced apart from the edge-shaped tool element portion.

* * * * *